US012325476B2

(12) United States Patent
Fujita

(10) Patent No.: US 12,325,476 B2
(45) Date of Patent: Jun. 10, 2025

(54) POSITION DETECTION DEVICE

(71) Applicant: DENSO CORPORATION, Kariya (JP)

(72) Inventor: Toshihiro Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 283 days.

(21) Appl. No.: 17/823,394

(22) Filed: Aug. 30, 2022

(65) Prior Publication Data

US 2022/0410966 A1 Dec. 29, 2022

Related U.S. Application Data

(63) Continuation of application No. PCT/JP2021/005906, filed on Feb. 17, 2021.

(30) Foreign Application Priority Data

Mar. 3, 2020 (JP) ................................ 2020-035841

(51) Int. Cl.
*B62D 5/04* (2006.01)
*B62D 6/00* (2006.01)
(Continued)

(52) U.S. Cl.
CPC ........... *B62D 6/002* (2013.01); *B62D 5/0481* (2013.01); *B62D 15/022* (2013.01); *G01B 7/30* (2013.01)

(58) Field of Classification Search
CPC .... B62D 6/002; B62D 5/0481; B62D 15/022; B62D 15/0235; G01B 7/30; G01D 3/02; G01D 3/08; G01D 5/12
See application file for complete search history.

(56) References Cited

U.S. PATENT DOCUMENTS 11,154,442 B1 * 10/2021 Dean ..................... A61G 5/1051
2006/0015231 A1 * 1/2006 Yoshimura ............ B60L 3/0076
701/1

(Continued)

FOREIGN PATENT DOCUMENTS

JP H10-329744 A 12/1998
JP 2014211410 A * 11/2014 ............... G01C 9/06
(Continued)

OTHER PUBLICATIONS

Kunimi Hitohisa, Aug. 22, 2013, English Machine Translation_JP 2015/040784 A provided by Patent Translate by EPO and Google (Year: 2013).*

(Continued)

*Primary Examiner* — Ashley L Redhead, Jr.
(74) *Attorney, Agent, or Firm* — Maschoff Brennan

(57) ABSTRACT

A position detection device includes a first positional sensor mounted on a reference portion, and a second positional sensor mounted on a detection target that is movable relative to the reference portion. A controller calculates a position of the detection target based on a detection value of the first positional sensor and a detection value of the second positional sensor. The position detection device may be applied to a steer-by-wire system for a vehicle. The reference portion may be a fixed portion of the vehicle, and the detection target may be a steering wheel or a vehicle wheel of the vehicle. The controller may calculate a steering angle of the steering wheel or a turning angle of the vehicle wheel as the position of the detection target.

9 Claims, 7 Drawing Sheets

(51) Int. Cl.
*B62D 15/02* (2006.01)
*G01B 7/30* (2006.01)

(56) References Cited

U.S. PATENT DOCUMENTS

| | | | |
|---|---|---|---|
| 2006/0232052 A1* | 10/2006 | Breed | B60R 21/013 |
| | | | 280/735 |
| 2009/0173566 A1 | 7/2009 | Ogasawara | |
| 2014/0131977 A1 | 5/2014 | Yamashiro | |
| 2015/0239501 A1 | 8/2015 | Fujita et al. | |
| 2016/0152259 A1* | 6/2016 | Donetti | B62D 5/006 |
| | | | 180/402 |
| 2021/0293534 A1* | 9/2021 | Müller | G01B 11/26 |

FOREIGN PATENT DOCUMENTS

| | | | |
|---|---|---|---|
| JP | 2015040784 A | * | 3/2015 |
| JP | 2016-000545 A | | 1/2016 |

OTHER PUBLICATIONS

Mizukami Shintaro, Apr. 22, 2013, English Machine Translation_ JP2014211410A provided by Patent Translate by EPO and Google (Year: 2013).*

Accelerometer based Steering Wheel Drowsy Driver Detection (Year: 2014).*

* cited by examiner

POSITION DETECTION DEVICE

CROSS REFERENCE TO RELATED APPLICATIONS

The present application is a continuation application of International Patent Application No. PCT/JP2021/005906 filed on Feb. 17, 2021, which designated the U.S. and claims the benefit of priority from Japanese Patent Application No. 2020-035841 filed on Mar. 3, 2020. The entire disclosures of all of the above applications are incorporated herein by reference.

TECHNICAL FIELD

The present disclosure relates to a position detection device.

BACKGROUND

Conventionally, a rotation angle detection device used for an electric power steering device is known.

SUMMARY

According to at least one embodiment of the present disclosure, a position detection device includes a first positional sensor mounted on a reference portion, and a second positional sensor mounted on a detection target that is movable relative to the reference portion. The position detection device includes a controller that calculates a position of the detection target based on a detection value of the first positional sensor and a detection value of the second positional sensor.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
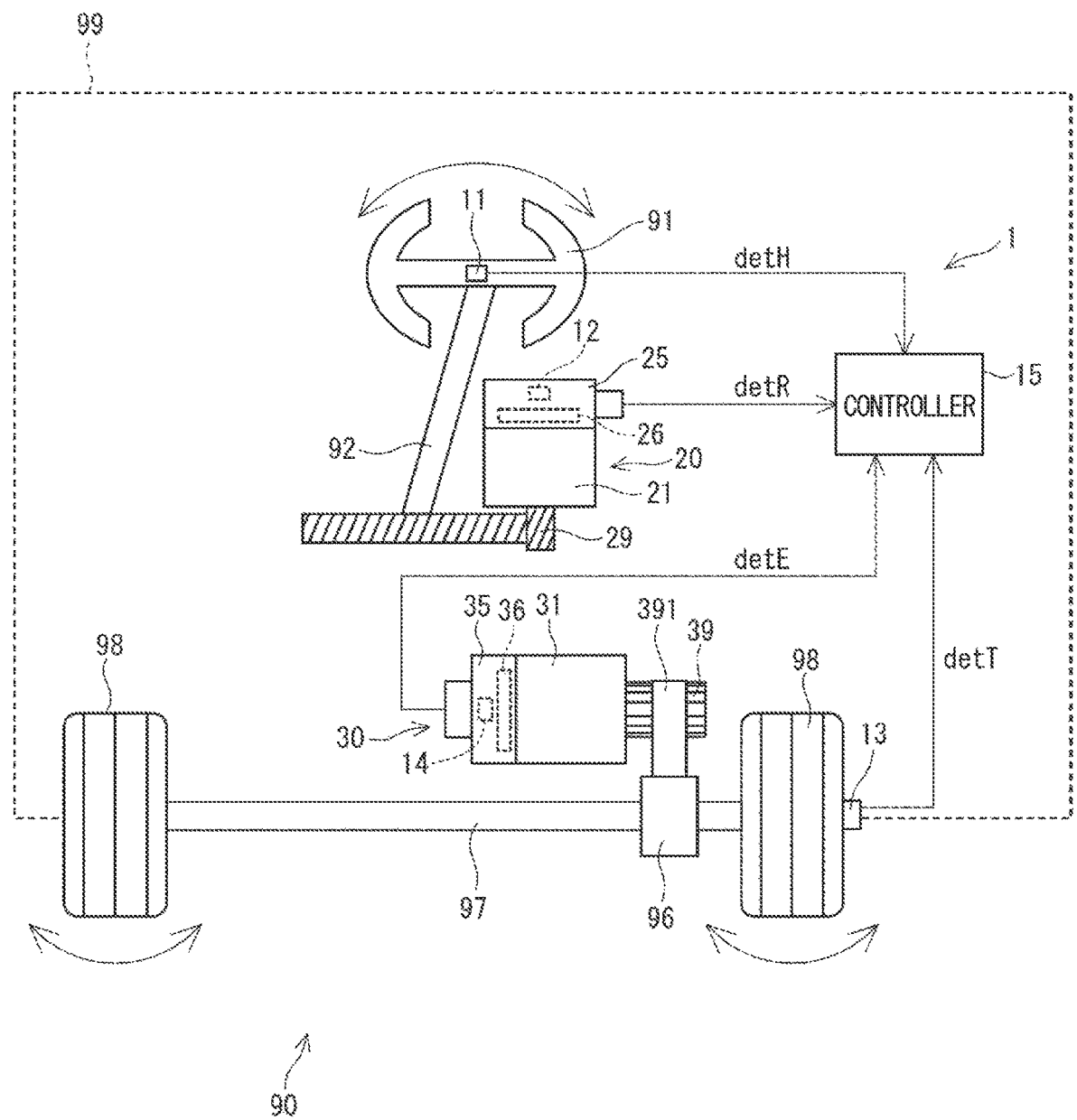
FIG. 1 is a schematic configuration diagram illustrating a steer-by-wire system according to a first embodiment.

To begin with, examples of relevant techniques will be described. A rotation angle detection device according to a comparative example is used for an electric power steering device. For example, calculation of a rotational speed of a motor of the electric power steering device can be continued even while an ignition switch is turned off, and a steering angle of a steering wheel is calculated based on a rotation angle and the rotational speed of the motor.

The electric power steering device includes sensors that detect rotations of the motor and the steering wheel of the electric power steering device, and the motor and the steering wheel are connected via a gear. Thus, if mechanical tooth skipping occurs, it is difficult to detect their rotations, and an incorrect angle may be calculated.

According to an aspect of the present disclosure, a position detection device includes a first positional sensor mounted on a reference portion, and a second positional sensor mounted on a detection target that is movable relative to the reference portion. The position detection device includes a controller that calculates a position of the detection target based on a detection value of the first positional sensor and a detection value of the second positional sensor. As a result, the position of the detection target can be directly detected without a gear or a belt.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2A:
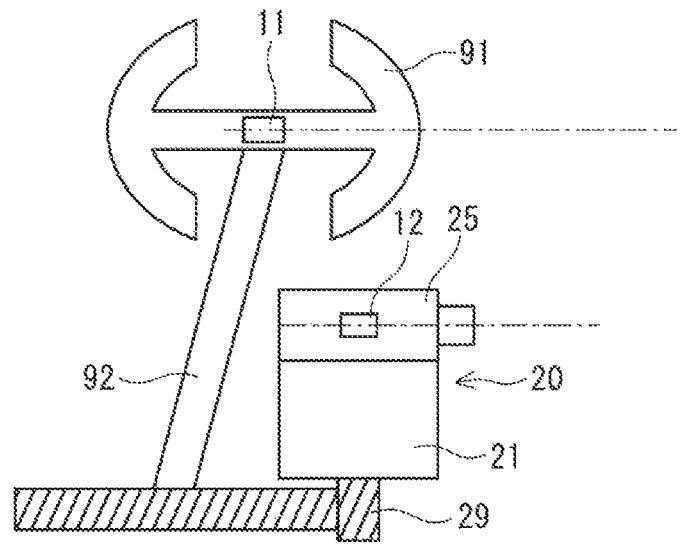
FIG. 2A is a schematic diagram illustrating a state where a steering wheel is at a midpoint in the first embodiment.
Figure 2B:
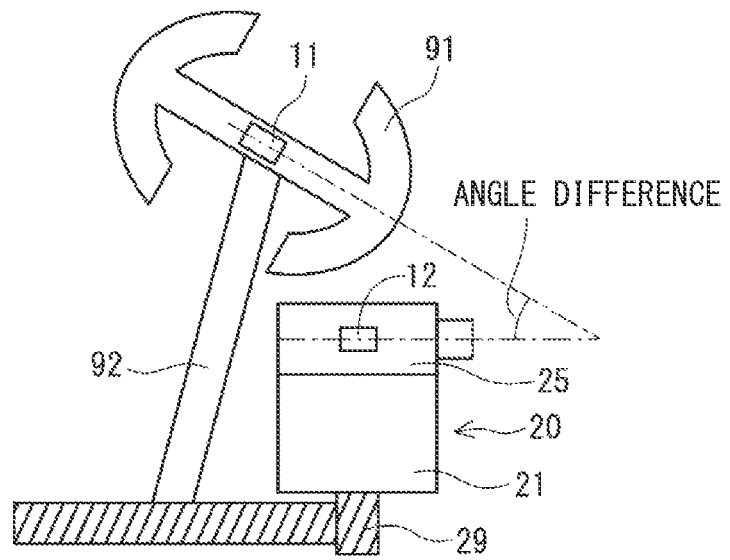
FIG. 2B is a schematic diagram illustrating a state where the steering wheel is shifted from the midpoint in the first embodiment.
Figure 3:
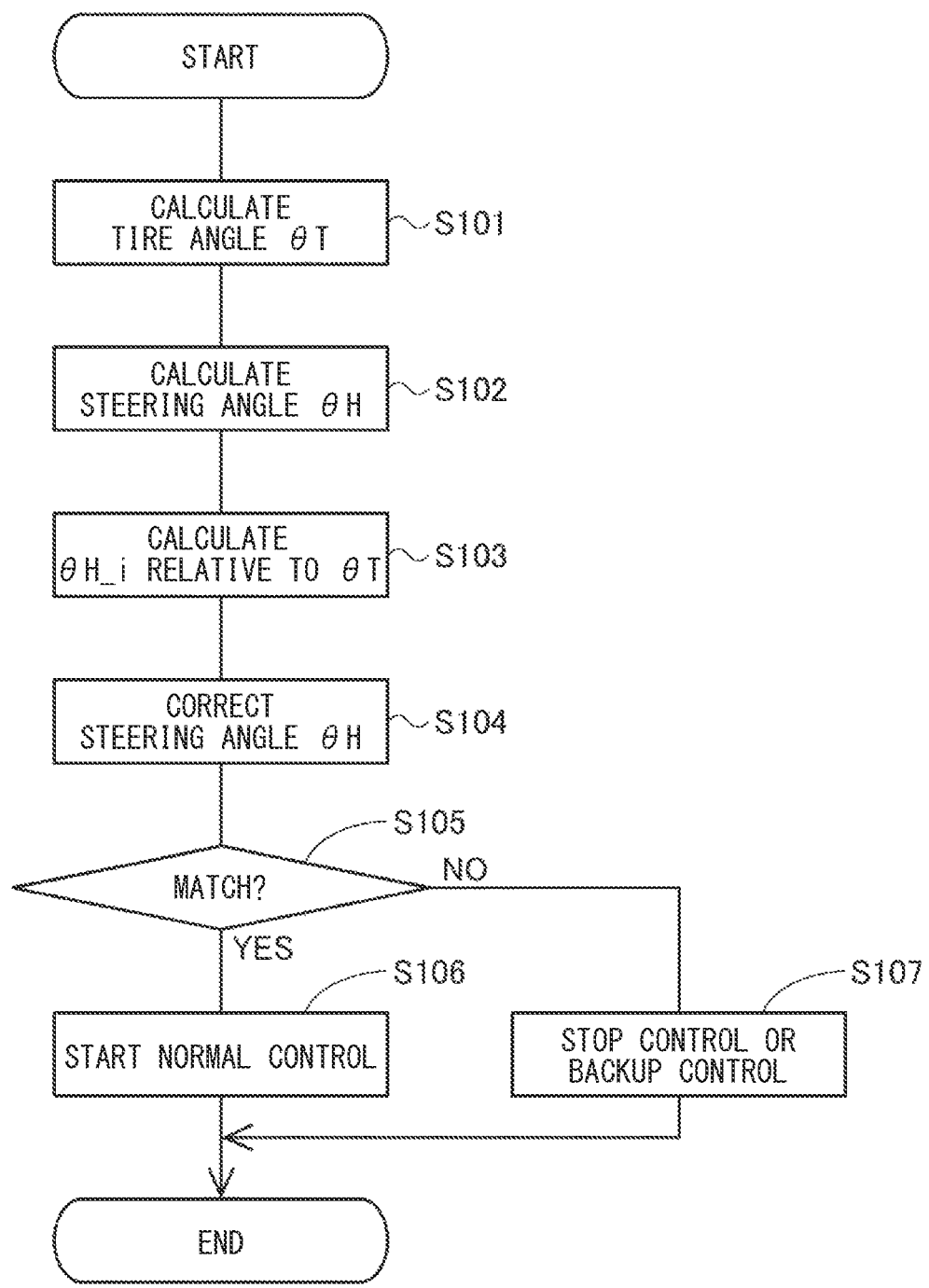
FIG. 3 is a flowchart for explaining angle calculation processing according to the first embodiment.

A position detection device according to a first embodiment is illustrated in FIG. 1 to FIG. 3. As illustrated in FIG. 1, a position detection device 1 is applied to a steer-by-wire system 90. The steer-by-wire system 90 includes the position detection device 1, a reaction force device 20, a wheel-turning device 30, a steering wheel 91, a steering shaft 92, a pinion gear 96, a rack shaft 97, and the like. The steering wheel 91 is provided at one end of the steering shaft 92. The steering shaft 92 is provided to be mechanically separable from the rack shaft 97. In FIG. 1, the steering shaft 92 and the rack shaft 97 are completely separated from each other, but a clutch capable of switching connection and disconnection may be provided between the steering shaft 92 and the rack shaft 97.

The reaction force device 20 includes a reaction force motor 21, a reaction force ECU 25, and a power transmission 29. The reaction force motor 21 is connected to the steering shaft 92 via the power transmission 29 including a gear and the like. The reaction force motor 21 gives an appropriate steering feeling to a driver by applying a reaction force corresponding to wheel steering by the driver given to the steering wheel 91. The reaction force ECU 25 includes a reaction force controller 26 to control the driving of the reaction force motor 21.

The wheel-turning device 30 includes a wheel-turning motor 31, a wheel-turning ECU 35, and a power transmission 39. The wheel-turning motor 31 changes a tire angle θT that is an angle of a vehicle wheel 98. Rotation of the wheel-turning motor 31 rotates the pinion gear 96 via the power transmission 39. A rotational movement of the pinion gear 96 is converted into a linear movement of the rack shaft 97 by a rack and pinion. As a result, the tire angle θT is changed by the rotation of the wheel-turning motor 31. A pair of the vehicle wheels 98 are connected to both ends of the rack shaft 97 via tie rods or the like. The vehicle wheels 98 are steered at an angle corresponding to a displacement amount of the rack shaft 97. The wheel-turning ECU 35 includes a wheel-turning controller 36 to control the driving of the wheel-turning motor 31. The power transmission 39 includes a belt 391.

The reaction force device 20 is a so-called "mechanically and electrically integrated type" in which the reaction force ECU 25 is integrally provided on one side in the axial direction of the reaction force motor 21. Similarly, the wheel-turning device 30 is a so-called "mechanically and electrically integrated type" in which the wheel-turning ECU 35 is integrally provided on one side of the wheel-turning motor 31. With the mechanically and electrically integrated type, the reaction force device 20 and the wheel-turning device 30 can be efficiently disposed in a vehicle having a limited mounting space. Note that at least one of the reaction force device 20 and the wheel-turning device 30 may be mechanically and electrically separated.

The position detection device 1 includes a steering-wheel position sensor 11, a reaction force motor position sensor 12, a tire position sensor 13, a wheel-turning motor position sensor 14, and a controller 15. The steering-wheel position sensor 11, the reaction force motor position sensor 12, the tire position sensor 13, and the wheel-turning motor position sensor 14 are all geomagnetic sensors. Therefore, it is desirable to configure the sensors such that a magnetic field from the motor or the like can be canceled.

The steering-wheel position sensor 11 is provided on the steering wheel 91 to transmit a steering-wheel position detection value detH to the controller 15. The reaction force motor position sensor 12 is provided in the reaction force ECU 25 to transmit a reaction force motor position detection value detR to the controller 15.

The tire position sensor 13 is provided in the vehicle wheel 98 to transmit a tire position detection value detT to the controller 15. The tire position sensor 13 is actually provided, for example, in the wheel, but for convenience, it is illustrated in the drawing as being adjacent to the vehicle wheel 98. The wheel-turning motor position sensor 14 is provided in the wheel-turning ECU 35 to transmit a wheel-turning motor position detection value detE to the controller 15. As described above, the reaction force motor position sensor 12 and the wheel-turning motor position sensor 14 are geomagnetic sensors. They are provided separately from rotation angle sensors that respectively detect rotation angles of the motors 21 and 31.

The reaction force motor position detection value detR and the wheel-turning motor position detection value detE are values that are not changed by steering or wheel turning. On the other hand, the steering-wheel position sensor 11 is provided on the steering wheel 91, so that the steering-wheel position detection value detH is changed by steering. In addition, the tire position sensor 13 is provided in the vehicle wheel 98, so that the tire position detection value detT is changed by wheel turning.

Each of the controller 15, the reaction force controller 26, and the wheel-turning controller 36 is mainly composed of a microcomputer and the like, and internally includes a CPU, a ROM, a RAM, an I/O (not illustrated), a bus line connecting these components, and the like. Each processing in each of the controllers may be software processing in which a program stored in advance in a tangible memory device (i.e., a readable non-transitory tangible recording medium), such as a ROM, is executed by a CPU, or may be hardware processing by a dedicated electronic circuit. In FIG. 1, the controller 15 is provided separately from the reaction force controller 26 and the wheel-turning controller 36, but each calculation by the controller 15 may be performed by the reaction force controller 26 or the wheel-turning controller 36. That is, at least one of the reaction force controller 26 and the wheel-turning controller 36 may constitute the "controller".

The controller 15 calculates a steering angle θH based on the steering-wheel position detection value detH and the reaction force motor position detection value detR. In addition, the controller 15 calculates the tire angle θT based on the tire position detection value detT and the wheel-turning motor position detection value detE.

When there is no angle difference between the steering-wheel position detection value detH and the reaction force motor position detection value detR, the steering wheel 91 is at the midpoint, as illustrated in FIG. 2A. When there is an angle difference between the steering-wheel position detection value detH and the reaction force motor position detection value detR, the steering wheel 91 is shifted from the midpoint, as illustrated in FIG. 2B.

In the present embodiment, the steering angle θH is calculated from an angle difference detH between the steering-wheel position detection value detH and the reaction force motor position detection value detR. Since there is a possibility that the vehicle itself may be tilted only with the steering-wheel position detection value detH, the steering angle θH is calculated from the tilt based on the reaction force motor position detection value detR as a vehicle reference. In the same way of thinking, the tire angle θT is calculated from an angle difference detT between the tire position detection value detT and the wheel-turning motor position detection value detE. Since both the reaction force motor position detection value detR and the wheel-turning motor position detection value detE are used as the vehicle reference, they may be shared. When the wheel-turning motor position detection value detE, for example, is shared, the wheel-turning motor position detection value detE is used in Expression (2) described later, instead of the reaction force motor position detection value detR.

Angle calculation processing of the present embodiment will be described with reference to the flowchart of FIG. 3. This processing is performed by the controller 15 when the vehicle is powered on. In addition, when the vehicle is powered off, the position may be fixed by storage or the like after this processing is performed. Hereinafter, the "step" of a step S101 is omitted and simply denoted by a symbol "S". The same applies to other steps.

In S101, the controller 15 calculates the tire angle θT (see Expression (1)). In S102, the controller 15 calculates the steering angle θH (see Expression (2)).

$$\theta T = (\det T - \det E + L) \times \alpha \quad (1)$$

$$\theta H = (\det H - \det R + M) \times \beta \quad (2)$$

In the Expressions, L and M are offset values. For example, a state where the steering wheel 91 is directed in a straight traveling direction is defined as a neutral position θH0=0 [deg]. Here, even at the neutral position θH0, a difference may occur between the steering-wheel position detection value detH and the reaction force motor position detection value detR due to an assembling error of the steering wheel 91, the reaction force motor 21, or the like.

Therefore, the offset value M for canceling a detection difference occurring at the neutral position θH0 is added. When, at the neutral position θH0, the steering-wheel position detection value detH is denoted by detH0 and the reaction force motor position detection value detR is denoted by detR0, the offset value M is represented by Expression (3). Similarly, when, at the neutral position θT0, the tire position detection value detT is denoted by detT0 and the wheel-turning motor position detection value detE is denoted by detE0, the offset value L is represented by Expression (4).

$$M = detR0 - detH0 \quad (3)$$

$$L = detE0 - detT0 \quad (4)$$

The offset values L and M may be design values according to assembly requirements, or may be values calculated in product shipping inspection. In addition, the offset values L and M may be appropriately updated, in consideration of aging deterioration, by recalculating when inspection or vehicle operation is performed.

α and β in Expressions (1) and (2) are conversion coefficients that are values determined according to detection means. For example, when both the tire position detection value detT and the wheel-turning motor position detection value detE are angles and a simple difference is sufficient, α=1 should be set. In addition, when the tire position detection value detT and the wheel-turning motor position detection value detE are values other than angle values, such as tilt, they are converted into angles by multiplying the difference value by a conversion coefficient α that is not 1. The same applies to β.

In S103, the controller 15 calculates a converted value θH_i of the steering angle relative to the tire angle θT (see Expression (5)). Expression (5) is a function for determining a remainder value, and a remainder obtained by dividing θT×γ by 360 is defined as the converted value θH_i. In the Expression, γ is a conversion coefficient corresponding to the relationship of the steering angle θH relative to the tire angle θT.

$$\theta H\_i = MOD(\theta T \times \gamma, 360) \quad (5)$$

In the present embodiment, the position detection device 1 is applied to the steer-by-wire system 90. When the relationship between the steering angle θH and the tire angle θT is corrected, for example, such that a cutting angle is increased at low speed and the cutting angle is decreased at high speed, γ should be set to be variable.

In S104, the controller 15 matches the relationship with the tire angle θT by correcting the steering angle θH based on an angle difference value ΔθH. Specifically, the steering wheel 91 is driven by driving the reaction force motor 21. The angle difference value ΔθH is calculated by Expression (6).

$$\Delta\theta H = \theta H\_i - \theta H \quad (6)$$

In S105, the controller 15 determines whether or not the steering angle θH after being corrected matches the converted value θH_i from the tire angle θT. When the difference is equal to or less than a determination threshold value in this determination, it is determined that the steering angle θH after being corrected matches the converted value θH_i from the tire angle θT.

When it is determined that the steering angle θH after being corrected matches the converted value θH_i from the tire angle θT (S105: YES), the process transfers to S106 to start normal control. When it is determined that the steering angle θH after being corrected does not match the converted value θH_i from the tire angle θT (S105: NO), the process transfers to S107. In S107, the calculation of the tire angle θT and the steering angle θH is abnormal, so that control is stopped or backup control is performed.

The steering wheel 91 is rotatable by 360° or more. Hereinafter, an angle that is a rotation angle from a reference position and includes multiple rotation information is defined as an "absolute angle". For example, a steering angle that is the absolute angle may be calculated from a rotational speed and a rotation angle using a motor rotation angle sensor. Therefore, in order to detect the rotational speed, constant power supply to the sensor is required. The absolute angle may be reset due to a battery malfunction.

In addition, the motor rotation angle sensor detects the rotation of a motor connected, via a gear or a belt, to the steering wheel 91 or the vehicle wheel 98 that are detection targets, so that it is difficult to detect mechanical tooth skipping with a value using the detection value of the motor rotation angle sensor. Furthermore, in the steer-by-wire system 90 as in the present embodiment, the traveling direction of the vehicle 99 or the steering wheel midpoint becomes unclear when the absolute angle of the steering angle θH, the tire angle θT, or the like is reset. As a result, there is a risk that the vehicle cannot be controlled.

In the present embodiment, the position detection device 1 is applied to the steer-by-wire system 90 in which the steering wheel 91 and the vehicle wheel 98 are mechanically separated from each other, so that information related to the rotational speed is unnecessary for calculating the steering angle θH. Therefore, if it is known how much the steering wheel 91 is tilted relative to the vehicle body, the steering angle θH can be calculated.

Therefore, in the present embodiment, the steering angle θH is calculated by: mounting the reaction force motor position sensor 12 on the side of the vehicle body that is the reference position; mounting the steering-wheel position sensor 11 on the side of the steering wheel 91 that is a detection target; and detecting how much the steering wheel 91 is tilted relative to the vehicle body from the difference between the detection values. Since the absolute angle is calculated based on relative positions, constant power supply is unnecessary. Even if a power supply failure occurs due to battery replacement or the like, the steering angle θH can be appropriately calculated when power is supplied again. In addition, even if belt skipping or gear tooth skipping occurs, the steering angle θH can be appropriately calculated.

The same applies to the tire angle θT. The tire angle θT is calculated by: mounting the wheel-turning motor position sensor 14 on the side of the vehicle body that is the reference position; mounting the tire position sensor 13 on the vehicle wheel 98 that is a detection target; and detecting how much the vehicle wheel 98 is tilted relative to the vehicle body from the difference between the detection values. As a result, even if a power supply failure, belt skipping, or gear tooth skipping occurs, the tire angle θT can be appropriately calculated.

As described above, the position detection device 1 includes the reaction force motor position sensor 12, the steering-wheel position sensor 11, and the controller 15. The reaction force motor position sensor 12 is mounted on the vehicle 99. In detail, the reaction force motor position sensor 12 is mounted on a location (the reaction force ECU 25 in the present embodiment) fixed to the vehicle 99. The steering-wheel position sensor 11 is mounted on the steering wheel 91 that is relatively movable relative to the vehicle 99. The controller 15 calculates the position of the steering wheel 91 based on the detection value of the reaction force motor position sensor 12 and the detection value of the steering-wheel position sensor 11. In detail, the controller 15 calculates the steering angle θH of the steering wheel 91 as the position of the detection target.

The position detection device 1 includes the wheel-turning motor position sensor 14, the tire position sensor 13, and the controller 15. The wheel-turning motor position sensor 14 is mounted on the vehicle 99. In detail, the wheel-turning motor position sensor 14 is mounted on a location (the wheel-turning ECU 35 in the present embodiment) fixed to the vehicle 99. The tire position sensor 13 is mounted on the vehicle wheel 98 that is relatively movable relative to the vehicle 99. In the present embodiment, the tire position sensor 13 is mounted on the vehicle wheel 98 that is a location movable in response to wheel turning. The controller 15 calculates the position of the vehicle wheel 98 based on the detection value of the wheel-turning motor position sensor 14 and the detection value of the tire position sensor 13. In detail, the controller 15 calculates the tire angle θT of the vehicle wheel 98 as the position of the detection target.

Here, the location fixed to the vehicle 99 is a portion that is not a movable portion to be detected, and is a location whose relative position relative to the movable portion can be known. For example, the frames of the vehicle 99 and components fixed to the frames are cited. In the present embodiment, the sensors related to the detection of the reference position are mounted, so that it is necessary to fix electronic components such as detection elements, calculators, and communication portions. The sensors may be mounted on other ECUs and the housing or the components may be shared. This can reduce cost. Examples of the other ECUs include an engine ECU, a brake ECU, and an EPS-ECU.

In the present embodiment, the steering-wheel position sensor 11 is provided in the steering wheel 91 that is a detection target, so that the detection target can be directly detected without a gear, a belt, or the like interposed therebetween. In addition, the difference between the detection value of the reaction force motor position sensor 12 and the detection value of the steering-wheel position sensor 11 is used, so that constant power supply is unnecessary. Therefore, even if a battery failure occurs, the steering angle θH or the tire angle θT can be calculated.

Based on one of the steering angle θH and the tire angle θT, the controller 15 calculates the converted value corresponding to the other of the steering angle θH and the tire angle θT. In the present embodiment, the converted value θH_i is calculated based on the tire angle θT. In addition, the steering angle θH is corrected such that the steering angle θH matches the converted value θH_i. As a result, the relationship between the steering angle θH and the tire angle θT can be matched.

Second Embodiment

Figure 4:
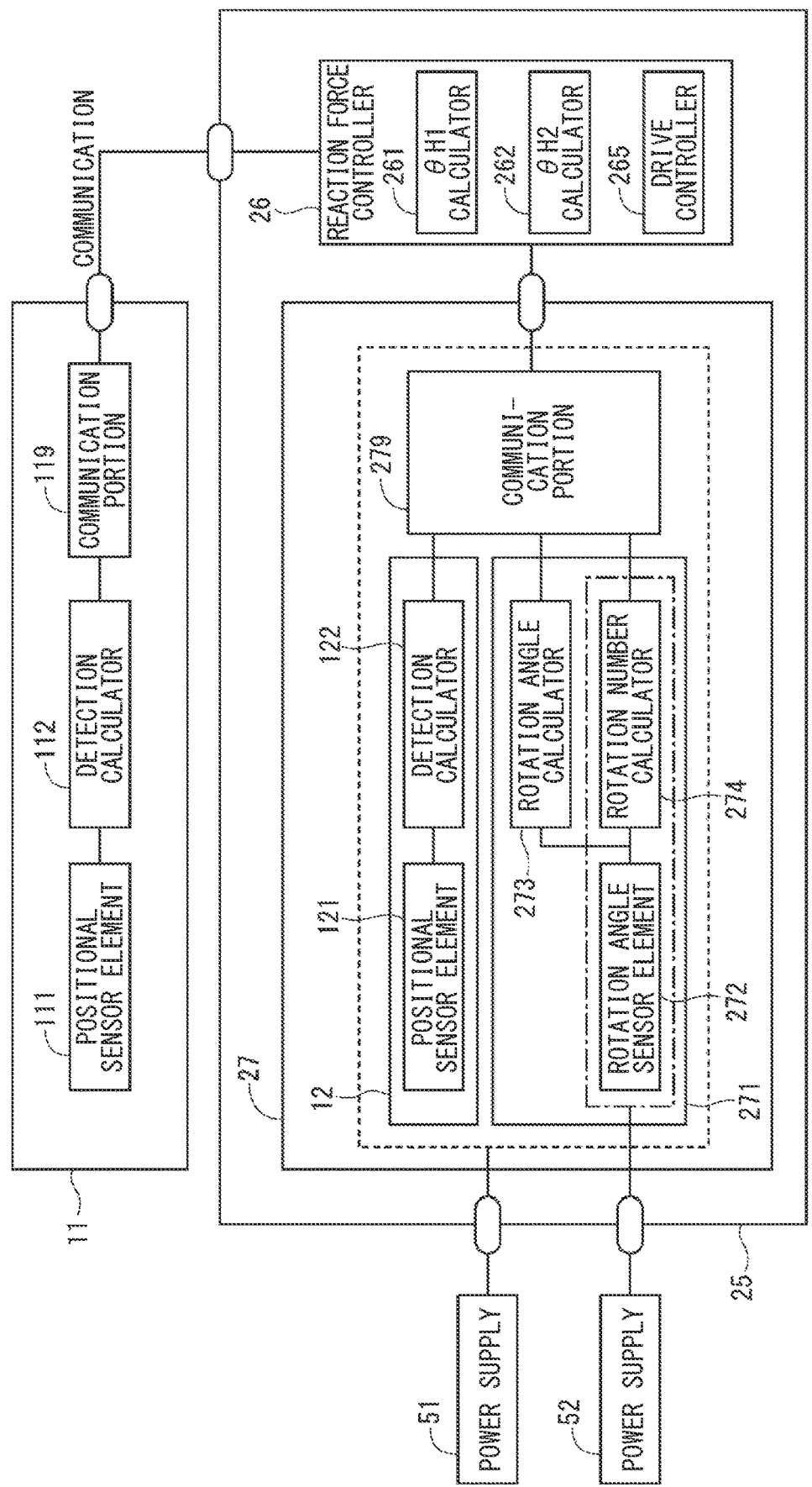
FIG. 4 is a block diagram illustrating a steering-wheel position sensor and a reaction force ECU according to a second embodiment.

A second embodiment is illustrated in FIG. 4. In the second embodiment, the calculation of the steering angle θH will be mainly described. The reaction force ECU 25 includes the reaction force controller 26 and a sensor unit 27, to which power is supplied from a power supply 51 via an ignition and a power supply 52 via a battery. In the drawing, power is constantly supplied from the power supply 52 to a rotation angle sensor element 272 and a rotational speed calculator 274 that are surrounded by a dashed line. In addition, while a vehicle start switch, such as an ignition switch, is turned on, power is supplied to each element surrounded by a broken line.

The sensor unit 27 includes the reaction force motor position sensor 12 including a positional sensor element 121 and a detection calculator 122, a rotation angle sensor 271, and a communication portion 279. The rotation angle sensor 271 includes a rotation angle sensor element 272, a rotation angle calculator 273, and a rotational speed calculator 274. The rotation angle calculator 273 calculates a motor rotation angle θM based on the detection value of the rotation angle sensor element 272. The rotational speed calculator 274 calculates a turn count value TC based on the detection value of the rotation angle sensor element 272. The turn count value TC is a value calculated, for example, for each predetermined rotation angle (e.g., 90°) of a rotor, by counting up or counting down depending on a rotation direction, and is a value that can be converted into the rotational speed. The communication portion 279 transmits the reaction force motor position detection value detR, the motor rotation angle θM, and the turn count value TC to the reaction force controller 26.

The steering-wheel position sensor 11 includes a positional sensor element 111, a detection calculator 112, and a communication portion 119. The detection calculator 112 calculates the steering-wheel position detection value detH based on the detection value of the positional sensor element 111. The steering-wheel position detection value detH calculated is transmitted to the reaction force ECU 25. Communication between the steering-wheel position sensor 11 and the reaction force ECU 25 may be performed by any communication method such as controller area network (CAN), CAN-FD, or SENT. Alternatively, wireless communication may be used.

The reaction force controller 26 includes a first steering angle calculator 261, a second steering angle calculator 262, and a drive controller 265. The first steering angle calculator 261 calculates a first steering angle θH1 based on the steering-wheel position detection value detH and the reaction force motor position detection value detR. The calculation of the first steering angle θH1 is the same as that in the above embodiment. The second steering angle calculator 262 calculates a second steering angle θH2 based on the motor rotation angle θM and the turn count value TC. That is, in the present embodiment, the reaction force controller 26 constitutes the "controller". The drive controller 265 controls the driving of the reaction force motor 21 based on various pieces of information such as the motor rotation angle θM.

The position detection device 1 includes the rotation angle sensor 271 that detects the motor rotation angle θM of the reaction force motor 21 capable of rotatably driving the steering wheel 91 via the power transmission 29 and the turn count value TC that is rotational speed information related to the motor rotational speed. The reaction force controller 26 calculates, as the position of the steering wheel 91, the first steering angle θH1 based on the reaction force motor position detection value detR and the steering-wheel position detection value detH, and the second steering angle θH2 based on the motor rotation angle θM and the turn count value TC.

In the present embodiment, the first steering angle θH1 and the second steering angle θH2 are calculated by different calculation methods to achieve redundancy, so that a robust system can be built. In addition, the reaction force controller 26 performs abnormality detection by comparing the steering angles θH1 and θH2. Furthermore, the reaction force controller 26 switches the steering angles θH1 and θH2 to be used for control depending on a condition. For example, when power is turned on or if a power failure occurs, the first steering angle θH1 is used, and while the vehicle is controlled, the second steering angle θH2 that can be precisely calculated is used. In addition, the same effects as those of the above embodiment are exerted.

Third Embodiment

Figure 5:
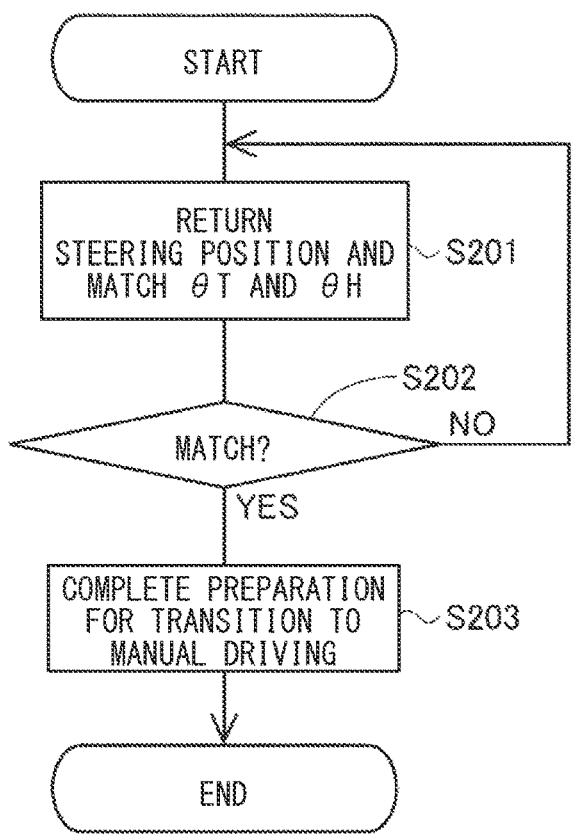
FIG. 5 is a flowchart for explaining pre-processing for transition to manual driving according to a third embodiment.

A third embodiment is illustrated in FIG. 5. In the first embodiment, the steering angle 6H is calculated from the angle difference ΔdetH between the steering-wheel position detection value detH and the reaction force motor position detection value detR. From the angle difference ΔdetH, a steering-wheel position Hposi relative to the vehicle 99 can also be calculated. Similarly, from the tire position detection value detT and the wheel-turning motor position detection value detE, a tire position Tposi relative to the vehicle can also be calculated in addition to the tire angle T.

In the present embodiment, the steering-wheel position Hposi is used for steering wheel storage control. FIG. 5 is a flowchart for explaining pre-processing for transition to manual control from automatic control in a case where automatic driving and manual driving can be switched to each other and the steering wheel 91 is stored during the automatic driving. This processing is performed by the controller 15 when a command of switching to manual driving from automatic driving is received from a non-illustrated upper-level ECU.

In S201, the controller 15 controls, for example, a motor and the like that drive a tilt mechanism and a telescopic mechanism such that the steering-wheel position Hposi becomes equal to that before the storage. In addition, the processes of S101 to S104 in FIG. 3 are performed to match the steering angle θH and the tire angle θT.

In S202, the controller 15 determines whether or not the steering-wheel position Hposi is located at a predetermined position and the relationship between the steering angle θH and the tire angle θT is matched. The "predetermined position" mentioned here is defined as the position of the steering wheel 91 before being stored. When it is determined that the steering-wheel position Hposi does not return to the predetermined position (S202: NO), the process returns to S201. When it is determined that the steering-wheel position Hposi returns to the predetermined position and the relationship between the steering angle θH and the tire angle θT is matched (S202: YES), the process transfers to S203 to complete preparation for transition to manual driving. After conditions other than the steering-wheel position are satisfied, the driving transfers to manual driving.

Figure 6:
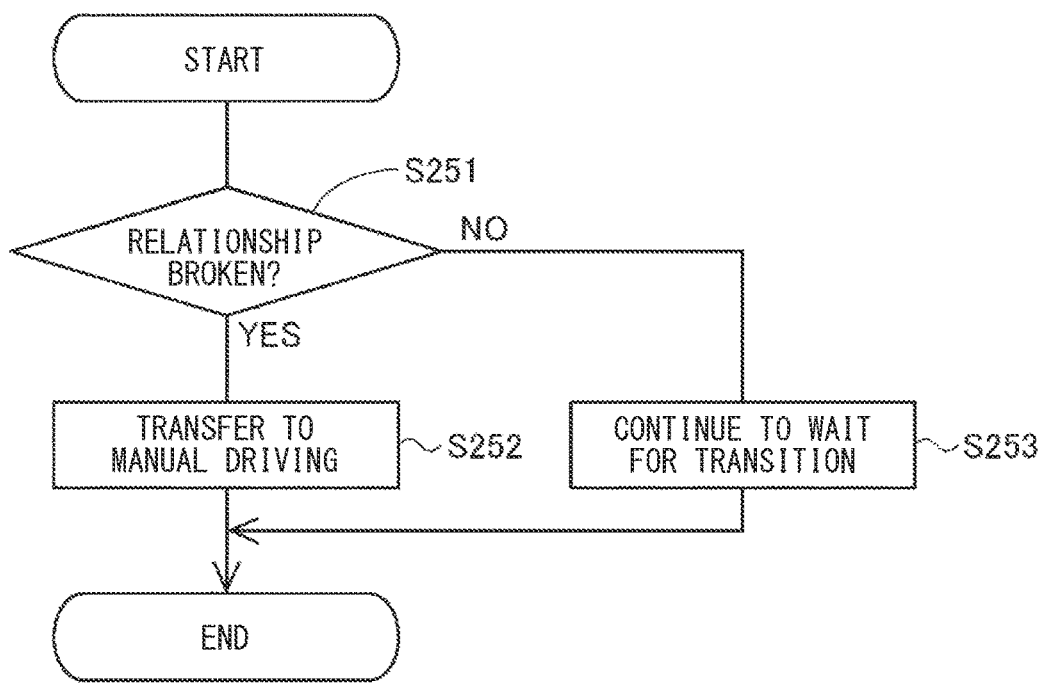
FIG. 6 is a flowchart for explaining processing for switching to manual driving according to the third embodiment.

FIG. 6 is a flowchart for explaining processing for switching to manual driving. The process is executed at a predetermined cycle by the controller 15 while waiting for a transition to manual driving. In S251, it is determined whether or not the relationship between the steering angle θH and the tire angle θT is broken. When it is determined that the relationship between the steering angle θH and the tire angle θT is not broken (S251: NO), the process transfers to S253 to continue waiting for the transition to manual driving. In this case, the driving transfers to manual driving by a command from the upper-level ECU or the like. When it is determined that the relationship between the steering angle θH and the tire angle θT is broken (S251: YES), the process transfers to S252.

In S252, when the relationship between the steering angle θH and the tire angle θT is broken although the steering angle θH and the tire angle θT are matched in the process illustrated in FIG. 5, it is considered that the driver has operated the steering wheel 91, and the driving transfers to manual driving. Note that, since the relationship may be broken due to disturbance, the determination threshold value may be varied or duration may be included in the determination conditions.

In the present embodiment, the controller 15 calculates the steering-wheel position Hposi relative to the vehicle 99 as the position of the detection target. As a result, tilt control and storage control of the steering wheel 91 can be performed. In addition, in a case where the steering wheel 91 is stored during automatic driving, the driving can be returned to manual driving at an appropriate timing after the steering wheel 91 returns to the original position at the time of returning to manual driving from automatic driving. In addition, the same effects as those of the above embodiment are exerted.

Fourth Embodiment

Figure 7:
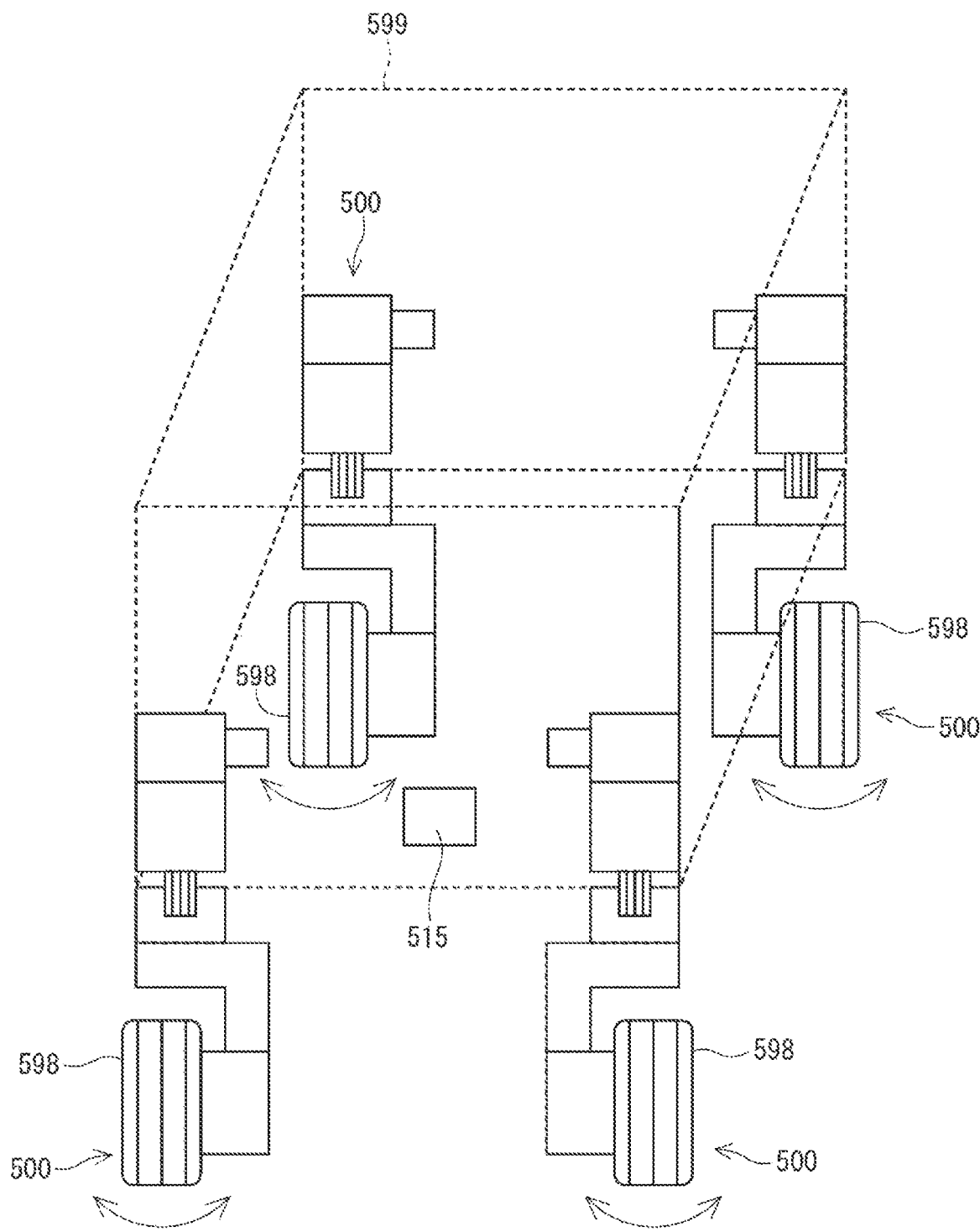
FIG. 7 is a schematic diagram for explaining a drive module according to a fourth embodiment.
Figure 8:
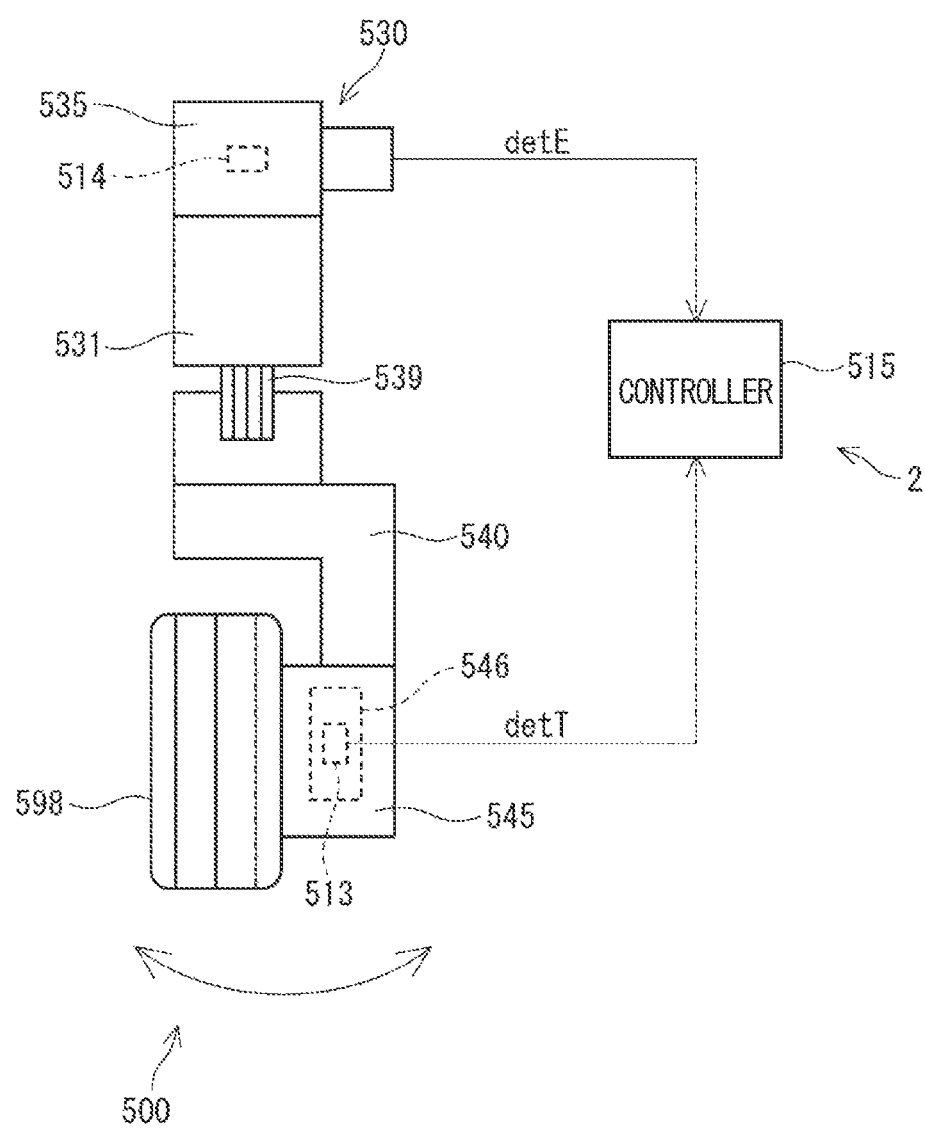
FIG. 8 is a schematic diagram for explaining the drive module according to the fourth embodiment.

A fourth embodiment is illustrated in FIG. 7 and FIG. 8. As illustrated in FIG. 7 and FIG. 8, a position detection device 2 of the present embodiment is applied to drive modules 500 capable of independently driving vehicle wheels 598. In the example of FIG. 7, the number of the wheels is four, but the number thereof is not limited. Each of the drive modules 500 includes a wheel-turning device 530, a gear 539, an arm 540, a machine driver 545, and the vehicle wheel 598.

The wheel-turning device 530 includes a wheel-turning motor 531 and a wheel-turning ECU 535. Details of the wheel-turning device 530 are similar to those of the wheel-turning device 30 of the above embodiment. The rotation of the wheel-turning motor 531 is transmitted to the arm 540 side via the gear 539, so that the arm 540, the machine driver 545, and the vehicle wheel 598 rotate. The machine driver 545 is provided with a machine motor, a brake, and a drive controller 546.

The position detection device 2 includes a tire position sensor 513, a wheel-turning motor position sensor 514, and a controller 515. The tire position sensor 513 is provided in the drive controller 546 of the machine driver 545 to transmit the tire position detection value detT to the controller 515. The wheel-turning motor position sensor 514 is provided in the wheel-turning ECU 535 to transmit the wheel-turning motor position detection value detE to the controller 515.

The controller 515 calculates the tire angle θT and the drive module position Mposi based on the tire position detection value detT and the wheel-turning motor position detection value detE. The drive module position Mposi includes a height and a distance from the reference position. In the present embodiment, the wheel-turning motor position sensor 514 serving as the vehicle reference is provided for each drive module 500, but a positional sensor to serve as a reference may be provided in the controller 515 mounted on the side of a vehicle 599. The positional sensor may be shared for calculating the four tire angles 8T and the drive module positions Mposi. Alternatively, the positional sensor to serve as a reference may be provided at a location different from a calculator 550 of the vehicle 599.

The position detection device 2 of the present embodiment is applied to the drive module 500 in which the vehicle wheel 598, the machine driver 545 that drives the vehicle wheel 598, and the wheel-turning device 530 are integrated. The tire position sensor 513 is mounted on the machine driver 545. The controller 515 calculates the tire angle θT of the vehicle wheel 598 as the detection target. As a result, even in a device in which the vehicle wheel 598 is independently controlled by, for example, an in-wheel motor or the like, the tire angle θT can be appropriately calculated.

In addition, the controller 515 calculates the drive module position Mposi as the position of the detection target. The drive module position Mposi means the height and distance of the drive module 500 from the reference position of the vehicle. As a result, the drive module position Mposi can be appropriately controlled. For example, it is possible to control the height of the vehicle 599 at the time of getting on and off the vehicle and the position of the drive module 500 in storing the tire in a parked state. In addition, the same effects as those of the above embodiments are exerted.

In the embodiments, the reaction force motor position sensor 12 and the wheel-turning motor position sensors 14 and 514 correspond to the "first positional sensor", the steering-wheel position sensor 11 and the tire position sensor 13 correspond to the "second positional sensor", the steering wheel 91 corresponds to the "steering member", and the vehicles 99 and 599 correspond to the "reference portion". In addition, the steering angle θH corresponds to a "steering angle", the tire angle θT corresponds to a "turning angle", and the steering-wheel position Hposi corresponds to a "steering member position". In addition, the first steering angle θH1 corresponds to "direct rotation information", and the second steering angle θH2 corresponds to "indirect rotation information".

In the above embodiments, the first positional sensor and the second positional sensor are geomagnetic sensors. In other embodiments, the first positional sensor and the second positional sensor may be tilt sensors, 3D sensors, or the like, or a combination thereof. By combining a plurality of sensors, detection accuracy can be improved, and for example, 180-degree inversion or the like can also be detected. In a case where a plurality of sensors are provided, abnormality detection may be performed by comparing values calculated for each sensor. Furthermore, one of the first sensor and the second sensor may be a magnet, and a relative position relative to the magnet may be detected.

In the above embodiments, the first positional sensor to serve as a reference is provided in the reaction force device or the wheel-turning device. In other embodiments, the first positional sensor can be mounted on a location that can be a reference in the vehicle. Alternatively, an existing sensor that is provided, for example, in a brake device or the like may be used as the first positional sensor. In the above embodiments, the second positional sensor related to the steering angle calculation is mounted on the wheel. In other embodiments, the second positional sensor may be mounted on a location other than the wheel that can be moved by wheel turning, such as a rack bar.

In the second embodiment, the second steering angle θH2 is calculated based on the motor rotation angle θM and the turn count value TC of the reaction force motor 21, whereby the calculation of the steering angle is made redundant. In other embodiments, the calculation of the tire angle may be made redundant by calculating the tire angle based on the rotation angle and the rotational speed of the wheel-turning motor. In this case, the turning angle based on the detection values of the turning motor position sensor and the tire position sensor corresponds to the "direct rotation information", and the turning angle based on the rotation angle and the rotational speed of the wheel-turning motor corresponds to the "indirect rotation information".

In the first embodiment, the converted value θH_i, corresponding to the steering angle θH, is calculated based on the tire angle θT, and the steering wheel 91 is driven by driving the reaction force motor 21 such that the relationship between the steering angle θH and the tire angle θT is matched. In other embodiments, the converted value θT_i, corresponding to the tire angle θT, may be calculated based on the steering angle θH, and the tire angle θT may be corrected by driving the wheel-turning motor 31 such that the relationship between the steering angle θH and the tire angle θT is matched.

In the above embodiments, the processing for matching the tire angle and the steering angle is performed when the vehicle is powered on or powered off. In other embodiments, the processing for matching the tire angle and the steering angle may be performed while the vehicle is controlled. In consideration of the possibility that the tire angle θT will not be stable due to vehicle vibration or user's steering while the vehicle is controlled, the determination threshold value related to the matching determination may be set to a relatively large value as compared with a case where the processing is performed while the vehicle is stopped.

In the above embodiments, the position detection device is applied to the steer-by-wire system or the drive module. In other embodiments, the position detection device can be applied to a device other than the steer-by-wire as long as the reference portion and a drive portion relatively movable relative to the reference portion include positional sensors. The position detection device may be used, for example: for optimization control of the correlation position of a transmission/reception portion during non-contact power supply; in a robot arm of industrial equipment; or the like.

The controllers and methods described in this application may be fully implemented by a special purpose computer created by configuring a processor programmed to execute one or more particular functions embodied in computer programs. Alternatively, the apparatuses and methods described in this application may be fully implemented by special purpose hardware logic circuits. Further alternatively, the apparatuses and methods described in this application may be implemented by a special purpose computer created by a combination of a processor executing computer programs coupled with hardware logic circuits.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A position detection device comprising:
a first positional sensor mounted on a reference portion;
a second positional sensor mounted on a detection target that is movable relative to the reference portion; and
a controller that calculates a position of the detection target based on a detection value of the first positional sensor and a detection value of the second positional sensor,
wherein the position detection device applied to a steer-by-wire system for a vehicle, and
wherein
the first positional sensor is mounted on a fixed portion of the vehicle that is the reference portion, the second positional sensor is mounted on a portion that is movable in accordance with turning of a vehicle wheel of the vehicle, and the controller calculates a turning angle of the vehicle wheel as the position of the detection target.

2. The position detection device according to claim 1, further comprising:
a third positional sensor mounted on another reference portion; and
a fourth positional sensor mounted on another detection target that is movable relative to the another reference portion,
wherein
the controller calculates a position of the another detection target based on a detection value of the third positional sensor and a detection value of the fourth positional sensor,
the third positional sensor is mounted on another fixed portion of the vehicle that is the reference portion,
the fourth positional sensor is mounted on a steering wheel of the vehicle that is another detection target, and
the controller calculates a steering angle of the steering wheel as the position of the another detection target.

3. The position detection device according to claim 1, comprising
a rotation angle sensor configured to detect:
a rotation angle of a motor that is capable of rotationally driving the detection target via a power transmission; and
rotational speed information related to a rotational speed of the motor, wherein
the controller calculates, as the position of the detection target, direct rotation information based on the first positional sensor and the second positional sensor, and indirect rotation information based on the rotation angle and the rotational speed of the motor.

4. The position detection device according to claim 1, wherein the first positional sensor and the second positional sensor are geomagnetic sensors or tilt sensors.

5. A position detection device comprising:
a first positional sensor mounted on a reference portion;
a second positional sensor mounted on a detection target that is movable relative to the reference portion; and
a controller that calculates a position of the detection target based on a detection value of the first positional sensor and a detection value of the second positional sensor,
wherein the position detection device is applied to a steer-by-wire system for a vehicle, and
wherein
the first positional sensor is mounted on a fixed portion of the vehicle that is the reference portion,
the second positional sensor is mounted on a steering wheel of the vehicle and a portion that is movable in accordance with turning of a vehicle wheel of the vehicle, and
the controller calculates a steering angle of the steering wheel and a turning angle of the vehicle wheel as the position of the detection target.

6. The position detection device according to claim 5, wherein
the controller is configured to:
calculates a converted value by converting one of the steering angle and the turning angle to the other of the steering angle and the turning angle; and
corrects the steering angle or the turning angle such that the other of the steering angle and the turning angle matches the converted value.

7. A position detection device comprising:
a first positional sensor mounted on a reference portion;
a second positional sensor mounted on a detection target that is movable relative to the reference portion; and
a controller that calculates a position of the detection target based on a detection value of the first positional sensor and a detection value of the second positional sensor,
wherein
the first positional sensor is mounted on a fixed portion of a vehicle that is the reference portion,
the second positional sensor is mounted on a steering wheel of the vehicle that is the detection target, and
the controller calculates a steering wheel position relative to the vehicle as the position of the detection target.

8. A position detection device comprising:
a first positional sensor mounted on a reference portion;
a second positional sensor mounted on a detection target that is movable relative to the reference portion; and
a controller that calculates a position of the detection target based on a detection value of the first positional sensor and a detection value of the second positional sensor,
wherein the position detection device is applied to a drive module integrally including a vehicle wheel, a machine driver that drives the vehicle wheel, and a wheel-turning device that turns the vehicle wheel, and
wherein
the second positional sensor is mounted on the machine driver, and
the controller calculates a turning angle of the vehicle wheel as the position of the detection target.

9. A position detection device comprising:
a first positional sensor mounted on a reference portion;
a second positional sensor mounted on a detection target that is movable relative to the reference portion; and
a controller that calculates a position of the detection target based on a detection value of the first positional sensor and a detection value of the second positional sensor,
wherein the position detection device is applied to a drive module integrally including a vehicle wheel, a machine driver that drives the vehicle wheel, and a turning device that turns the vehicle wheel, and
wherein
the second positional sensor is mounted on the machine driver, and
the controller calculates a position of the drive module as the position of the detection target.

* * * * *